United States Patent
Hakamada

(10) Patent No.: US 10,432,803 B2
(45) Date of Patent: Oct. 1, 2019

(54) IMAGE FORMATION SYSTEM INCLUDING ENCODED IMAGE GENERATION DEVICE AND IMAGE FORMATION DEVICE

(71) Applicant: RISO KAGAKU CORPORATION, Minato-ku, Tokyo (JP)

(72) Inventor: Junichi Hakamada, Tsukuba (JP)

(73) Assignee: RISO KAGAKU CORPORATION, Tokyo (JP)

( * ) Notice: Subject to any disclaimer, the term of this patent is extended or adjusted under 35 U.S.C. 154(b) by 0 days.

(21) Appl. No.: 15/879,725

(22) Filed: Jan. 25, 2018

(65) Prior Publication Data
US 2018/0270370 A1    Sep. 20, 2018

(30) Foreign Application Priority Data
Mar. 16, 2017 (JP) ................ 2017-051008

(51) Int. Cl.
*H04N 1/40* (2006.01)
*H04N 1/00* (2006.01)
(Continued)

(52) U.S. Cl.
CPC ....... *H04N 1/00233* (2013.01); *G03G 21/046* (2013.01); *G06F 3/1222* (2013.01); *G06F 3/1298* (2013.01); *G07D 7/004* (2013.01); *H04N 1/00843* (2013.01); *H04N 1/00875* (2013.01); *H04N 1/00877* (2013.01); *H04N 1/32101* (2013.01); *H04N 1/32566* (2013.01); *H04N 1/444* (2013.01); *H04N 1/4406* (2013.01); *H04N 1/4486* (2013.01); *G03G 21/04* (2013.01); *H04N 1/00832* (2013.01); *H04N 1/00838* (2013.01); *H04N 1/448* (2013.01); *H04N 2201/3201* (2013.01); *H04N 2201/3238* (2013.01)

(58) Field of Classification Search
None
See application file for complete search history.

(56) References Cited

U.S. PATENT DOCUMENTS 8,194,289 B2    6/2012  Hosoda
2006/0197972 A1    9/2006  Hayashi
(Continued)

FOREIGN PATENT DOCUMENTS

JP    2007235375 A    9/2007

OTHER PUBLICATIONS

Extended European Search Report (EESR) dated Jul. 6, 2018 issued in European Application No. 18154185.5.

*Primary Examiner* — Henok Shiferaw
(74) *Attorney, Agent, or Firm* — Holtz, Holtz & Volek PC

(57) ABSTRACT

An image formation system includes: an encoded image generation device including a first processor that generates print data from manuscript data, sets security information for controlling a print mode of the print data, and generates an encoded image from the print data and the security information; and an image formation device including a second processor that inputs the encoded image, decodes the print data and the security data from the input encoded image, determines whether an output of the decoded print data is available in accordance with the decoded security information, and outputs the decoded print data when it is determined that the output of the print data is available.

2 Claims, 7 Drawing Sheets

(51) Int. Cl.
  *G03G 21/04* (2006.01)
  *G07D 7/004* (2016.01)
  *H04N 1/32* (2006.01)
  *G06F 3/12* (2006.01)
  *H04N 1/44* (2006.01)

(56) References Cited

U.S. PATENT DOCUMENTS

| | | |
|---|---|---|
| 2007/0201085 A1 | 8/2007 | Yokochi |
| 2009/0190183 A1 | 7/2009 | Hosoda |
| 2012/0057742 A1 | 3/2012 | Hosoda |
| 2013/0077124 A1* | 3/2013 | Vojak ................ H04N 1/00233 358/1.14 |
| 2015/0002880 A1* | 1/2015 | Hakamada ............. G06K 1/121 358/1.14 |
| 2015/0092247 A1* | 4/2015 | Ming ................ H04N 1/32144 358/3.28 |

* cited by examiner

IMAGE FORMATION SYSTEM INCLUDING ENCODED IMAGE GENERATION DEVICE AND IMAGE FORMATION DEVICE

CROSS-REFERENCE TO RELATED APPLICATION

This application is based upon and claims the benefit of priority of the prior Japanese Patent Application No. 2017-051008, filed on Mar. 16, 2017, the entire contents of which are incorporated herein by reference.

FIELD

The embodiments discussed herein are related to an image formation system that performs printing while controlling security off-line.

BACKGROUND

In recent years, in many environments such as offices, an information terminal device and a multifunction printer have been connected to each other via a network, and a user of the information terminal device has been able to cause the multifunction printer to perform print processing on desired data by issuing a print instruction on the information terminal device.

Security for a printing operation is required in many cases such as a case in which a permission is only given to a specified multifunction printer or a case in which a specified printed matter is not permitted to be reprinted. In a case in which an information terminal device and a multifunction printer are connected to each other via a network, as described above, various technologies are known as a technology for controlling security for a printing operation via the network. In an environment in which the multifunction printer is not connected to the network, for example in a case in which data to be printed is stored in a universal serial bus (USB) memory, the USB memory is inserted into an insertion port of the multifunction printer, and print processing is performed, a technology is conceivable for including security information in electronic data to be stored in the USB memory so as to control security for a printing operation.

However, in a case in which security for a printing operation is controlled by using a USB memory or the like in an environment in which a multifunction printer is not connected to a network, as described above, a manuscript always needs to be converted into electronic data. Therefore, as an example, in a case in which a document is first printed on paper, a printed matter is read by an off-line multifunction printer, and regular printing is performed, a problem arises wherein security for such paper printed matter fails to be controlled.

Conventionally, as a technology for reading paper printed matter and controlling the printing out of the printed matter, a technology is known in which when the number of times in which it is determined that specified image data is included in read image data is, for example, 0, an output is started before the determination of image data is completed such that an unnecessary waiting time of a general user is eliminated, and when the number of times of the determination above is, for example, one or more, an output is only started after it is determined that the specified image data is not included such that a specified image is prevented from being output (for example, Japanese Laid-Open Patent Publication No. 2007-235375).

SUMMARY

In one aspect, an image formation system includes an encoded image generation device including a first processor that generates print data from manuscript data, sets security information for controlling a print mode of the print data, and generates an encoded image from the print data and the security information. In addition, the image formation system includes an image formation device including a second processor that inputs the encoded image, decodes the print data and the security data from the input encoded image, determines whether an output of the decoded print data is available in accordance with the decoded security information, and outputs the decoded print data when it is determined that the output of the print data is available.

The object and advantages of the invention will be realized by means of the elements and combinations particularly pointed out in the claims.

DESCRIPTION OF EMBODIMENTS

The prior art described above is a technology for determining whether specified image data is included in read image data, and therefore this technology is effective to prevent, for example, paper money, securities, or the like from being forged. However, there is a problem wherein it is impossible to apply security using, for example, paper printed matter such that the number of times of printing at the time of reading the paper printed matter using a multifunction printer is restricted or only a specified multifunction printer is permitted to perform printing.

Figure 1:
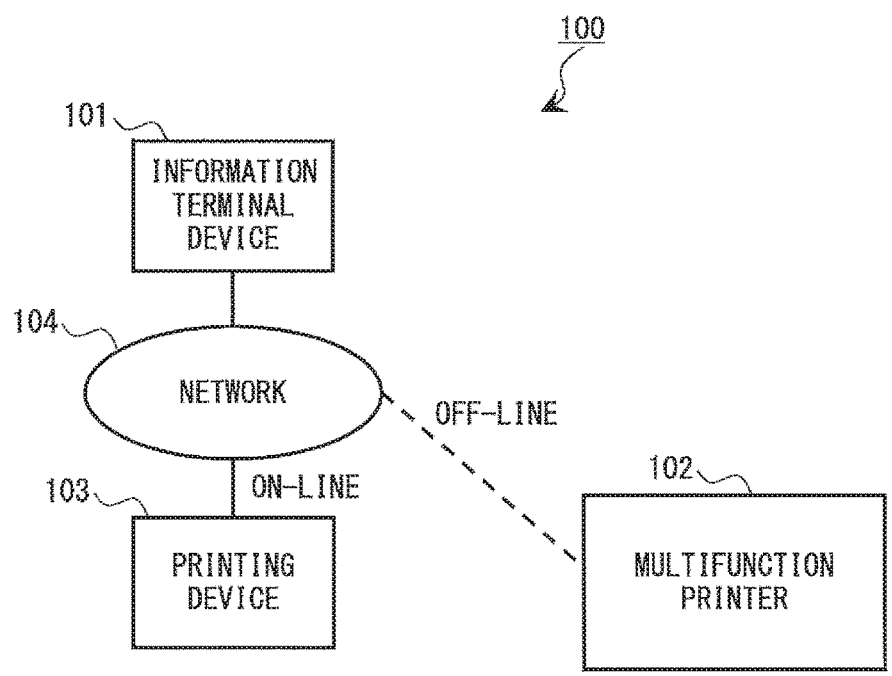
FIG. 1 illustrates an example of a system configuration of an embodiment of an image formation system.

Embodiments are described below in detail with reference to the drawings. FIG. 1 illustrates an example of a system configuration of an embodiment of an image formation system. As illustrated in FIG. 1, an image formation system 100 includes an information terminal device 101 serving as an encoded image generation device, a multifunction printer 102 serving as an image formation device that is off-line (illustrated with a dotted line in FIG. 1) from the information terminal device 101, and a printing device 103 that is connected on-line to the information terminal device 101 via a network 104 such as a local area network.

Figure 2:
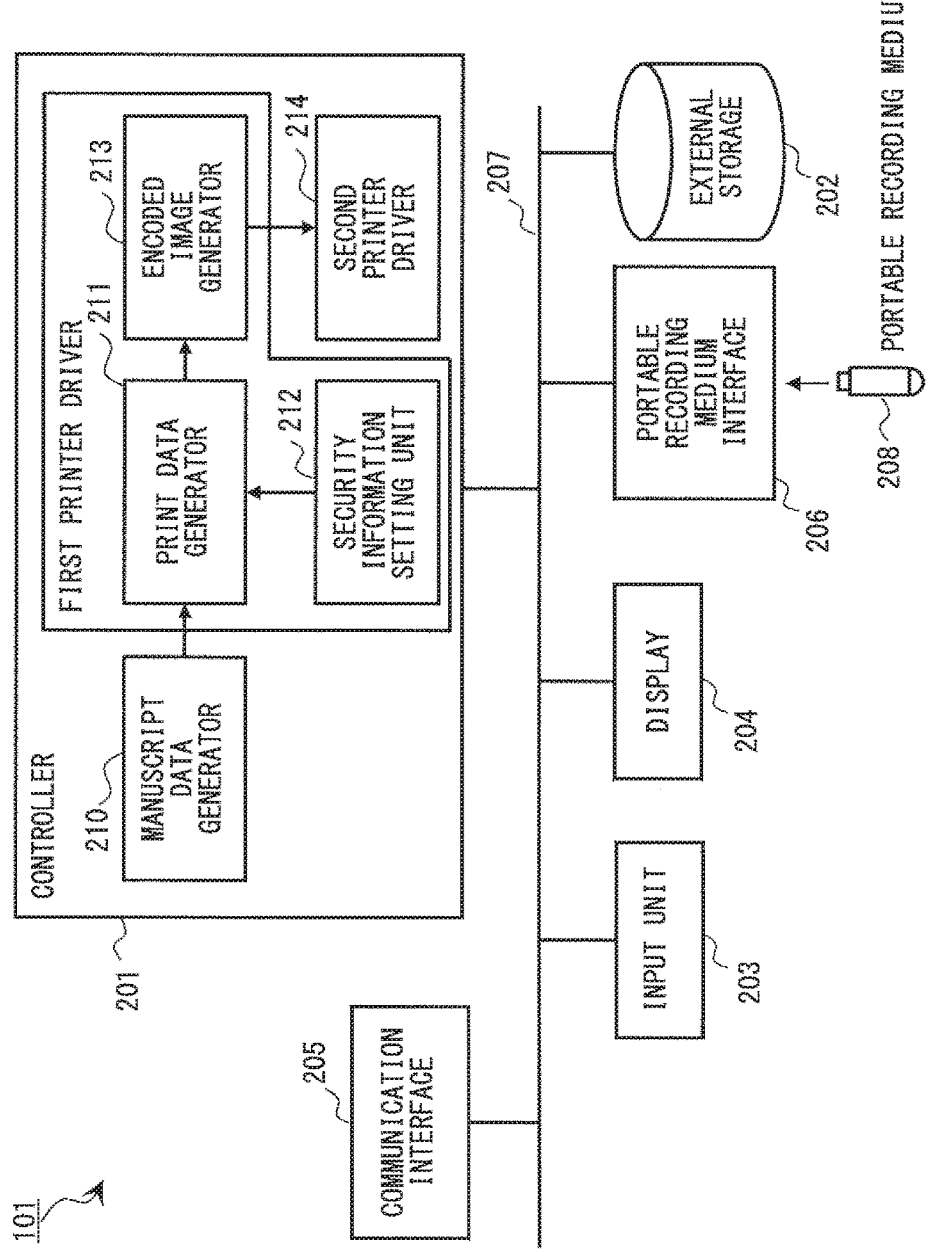
FIG. 2 is a block diagram illustrating an exemplary configuration of an embodiment of an information terminal device serving as an encoded image generation device.

FIG. 2 is a block diagram illustrating an exemplary configuration of an embodiment of the information terminal device 101 of FIG. 1, which is an encoded image generation device. The information terminal device 101 has a configuration in which a controller 201, an external storage 202, an input unit 203, a display unit 204, a communication interface 205, and a portable recording medium interface 206 are connected to each other via a bus 207. The controller 201 further includes: a manuscript data generator 210; a print data generator 211, a security information setting unit 212, and an encoded image generator 213 that operate as a first printer driver; and a second printer driver 214.

In the configuration of the information terminal device 101 illustrated in FIG. 2, the controller 201 is a dedicated hardware device that implements functions of the respective components 210 to 214 or a processor that executes a control program stored in a memory (not particularly illustrated). A processor included in the hardware device above or the processor above that executes the control program is an example of a first processor. In the controller 201, the manuscript data generator 210 is a unit that executes various applications including a word processor, spreadsheet software, and the like in order to generate manuscript data to be printed.

The print data generator 211 included in the first printer driver that is executed by the controller 201 generates print data from the manuscript data generated by the manuscript data generator 210. The print data describes the manuscript data using, for example, a specified printer language.

The security information setting unit 212 included in the first printer driver that is executed by the controller 201 sets security information for controlling a print mode of the print data.

The encoded image generator 213 included in the first printer driver that is executed by the controller 201 generates an encoded image from the print data generated by the print data generator 211 and the security information set by the security information setting unit 212.

The second printer driver 214 that is executed by the controller 201 is started by the first printer driver after the encoded image generator 213 generates the encoded image, and the second printer driver 214 issues an instruction to print the encoded image forwarded from the first printer driver, to the printing device 103 that is connected to the information terminal device 101 via the network 104 of FIG. 1.

The external storage 202 is, for example, a hard disk storage or a semiconductor disk device, and stores various control programs executed by the controller 201, manuscript data, print data, data of an encoded image, and the like.

The input unit 203 is, for example, a keyboard or a pointing device that is used for a user to generate manuscript data or to input a print instruction to the first printer driver. The output unit 109 is, for example, a liquid crystal display used to display the manuscript data or various types of data.

The communication interface 205 relays the transmission or reception of data between the controller 201 and the network 104 of FIG. 1.

The portable recording medium interface 206 houses a portable recording medium 208 such as a USB memory, an SD card memory, a CompactFlash memory, a CD-ROM, a DVD, or an optical disk, and the portable recording medium interface 206 plays a role to assist the external storage 202.

The information terminal device 101 according to this embodiment may be implemented by a processor executing control programs that implement various functions of the controller 201. The control programs may be distributed by being recorded, for example, in the external storage 202 or the portable recording medium 208, or may be obtained from the network 104 (FIG. 1) by the communication interface 205.

Figure 3:
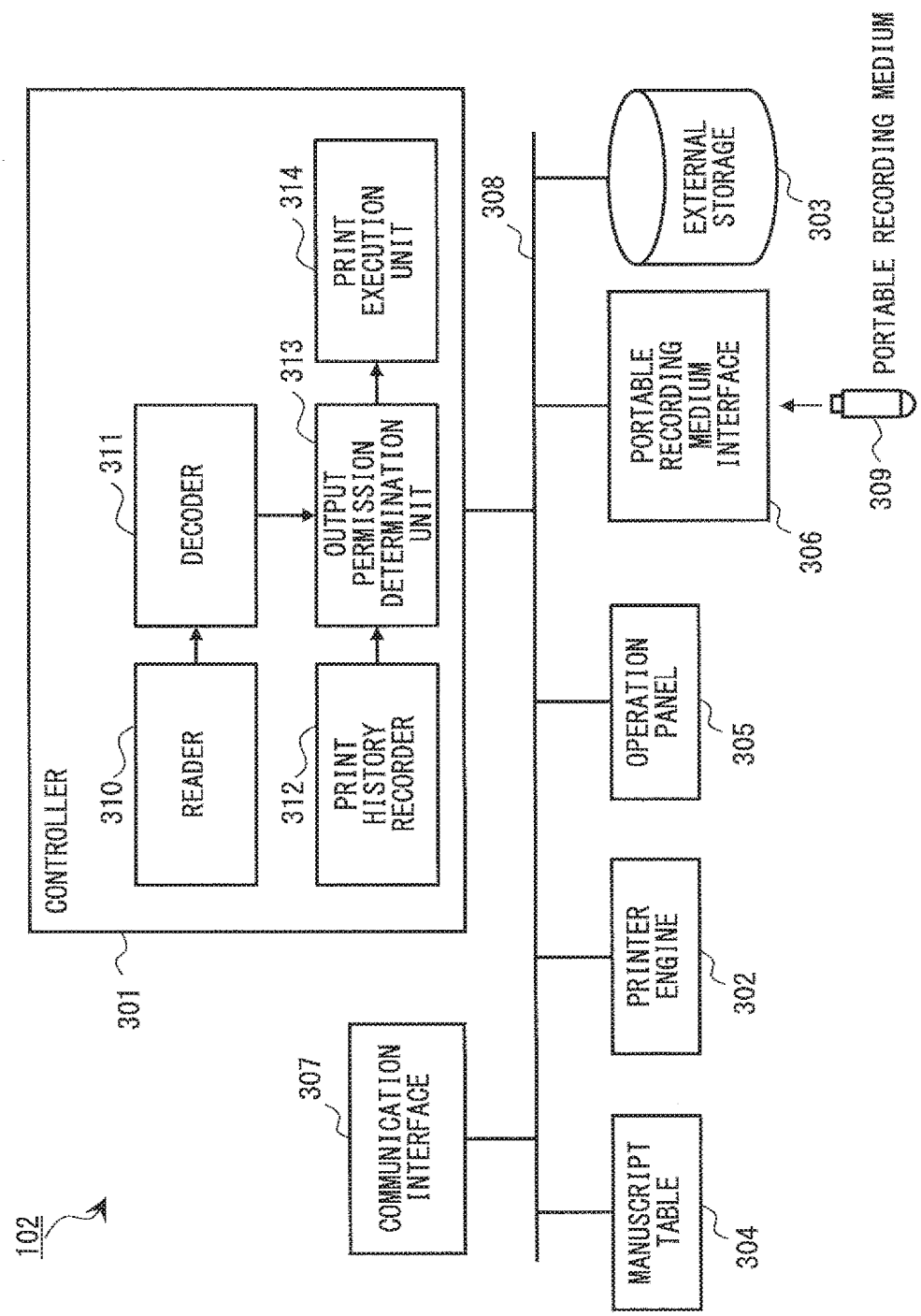
FIG. 3 is a block diagram illustrating an exemplary configuration of an embodiment of a multifunction printer serving as an image formation device.

FIG. 3 is a block diagram illustrating an exemplary configuration of an embodiment of the multifunction printer 102 of FIG. 1, which is an image formation device. The multifunction printer 102 has a configuration in which a controller 301, a printer engine 302, an external storage 303, a manuscript table 304 including an image reading unit, an operation panel 305, a portable recording medium interface 306, and a communication interface 307 are connected to each other via a bus 308. The controller 301 further includes a reader 310, a decoder 311, a print history recorder 312, an output permission determination unit 313, and a print execution unit 314.

In the configuration of the multifunction printer 102 illustrated in FIG. 3, the controller 301 is a dedicated hardware device that implements functions of the respective components 310 to 314 or a processor that executes a control program stored in a memory (not particularly illustrated). A processor included in the hardware device above or the processor above that executes the control program is an example of a second processor.

The reader 310 executed by the controller 301 operates as an encoded image input unit that inputs an encoded image, and the reader 310 scans and reads an encoded image that has been printed on a paper medium placed on the manuscript table 304 by controlling an image reading unit (not particularly illustrated) that is arranged below the manuscript table 304.

The decoder 311 executed by the controller 301 decodes print data and security information from the encoded image read by the reader 310.

A portion configured by the print history recorder 312 and the output permission determination unit 313 that are executed by the controller 301 determines whether an output of the print data decoded according to the security information decoded by the decoder 311 is available. The print history recorder 312 records, for example, in the external storage 303, print history information including manuscript identification information included in the security information decoded by the decoder 311 and information relating to the accumulated number of outputs of the print data decoded by the decoder 311, every time the print execution unit 314 outputs the decoded print data. Specifically, when print history information that corresponds to the manuscript identification information has not been recorded, the print history recorder 312 records print history information that corresponds to the manuscript identification information and in which the accumulated number of outputs has been set to 1. When the print history information that corresponds to the manuscript identification information has been recorded, the print history recorder 312 increments the accumulated number of outputs set in the print history information by 1. The operation of the output permission determination unit 313 will be described later.

The print execution unit 314 and the printer engine 302 controlled by the print execution unit 314 operate as a printing unit that prints out the print data decoded by the decoder 311 when the output permission determination unit 313 determines that an output of the print data is available. Specifically, the print execution unit 314 generates image data for printing according to the print data, and outputs the image data to the printer engine 302. The printer engine 302 controls the feeding, delivery, and ejection of paper, and executes the printing of the image data input from the print execution unit 314.

The external storage 303 is, for example, a hard disk storage or a semiconductor disk device, and the external storage 303 stores various print control programs executed by the controller 301, decoded print data and data of security information, data of print history information, image data for printing, and the like.

The operation panel 305 is, for example, a touch panel and a liquid crystal display device that are used, for example, for a user to issue various print instructions or to display a print state.

When the multifunction printer 102 is connected to a local area network (not particularly illustrated) or the like, the communication interface 307 relays the transmission or reception of data between the network and the controller 301. The communication interface 307 may be optional, and is not particularly used in this embodiment, and the multifunction printer 102 is used off-line, for example, to the network 104 of FIG. 1.

The portable recording medium interface 306 houses a portable recording medium 309 such as a USB memory, an SD card memory, a CompactFlash memory, a CD-ROM, a DVD, or an optical disk, and the portable recording medium interface 306 plays a role to assist the external storage 303.

The multifunction printer 102 according to this embodiment may be implemented by a processor executing print control programs for implementing various functions of the controller 301. The control programs may be distributed by being recorded, for example, in the external storage 303 or the portable recording medium 309, or may be obtained from a network by the communication interface 307.

Figure 4:
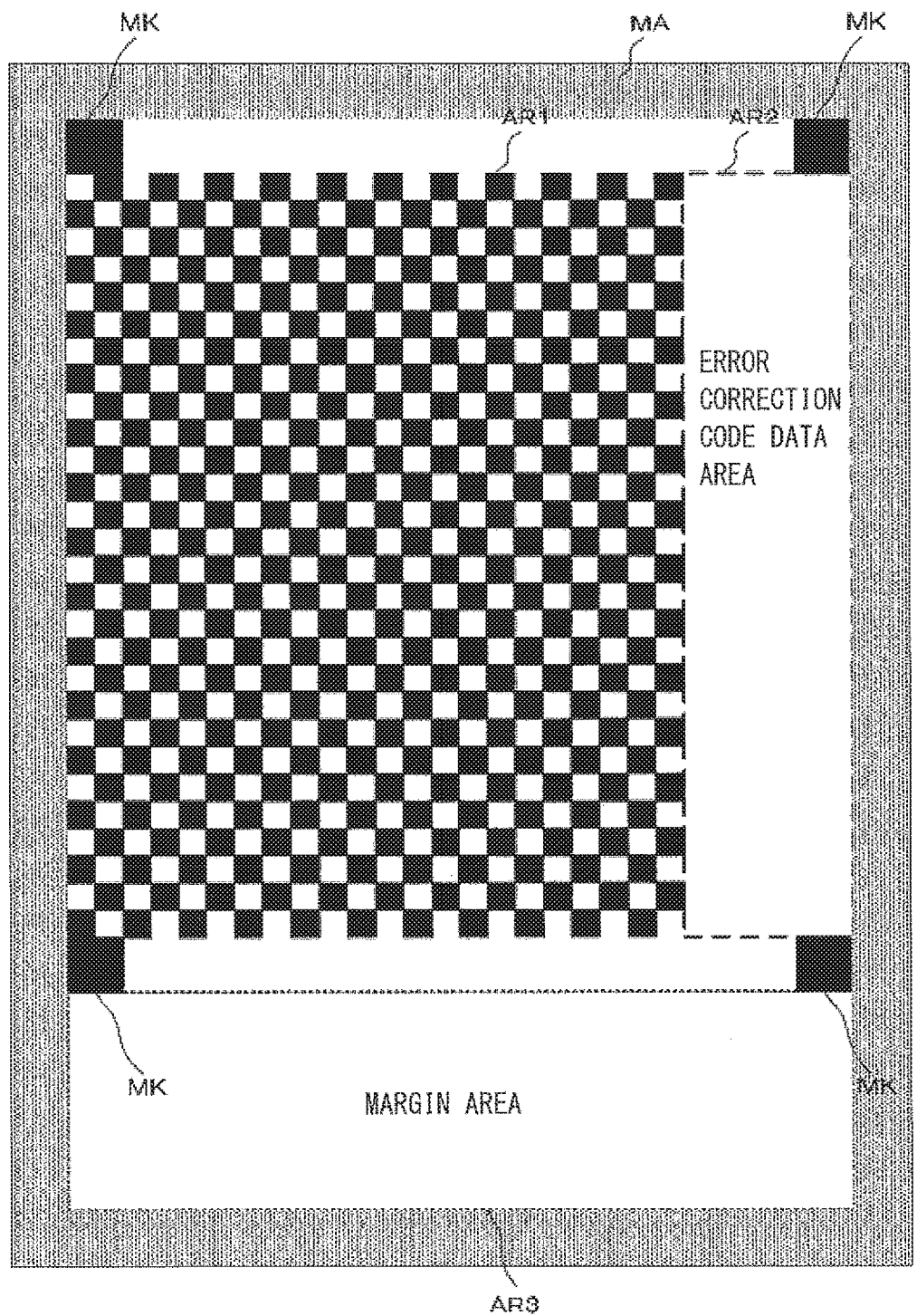
FIG. 4 illustrates an example of an encoded image.

FIG. 4 illustrates an example of an encoded image that is generated by the encoded image generator 213 of FIG. 2 and that is printed on a paper medium by the second printer driver 214 by using the printing device 103 of FIG. 1. In the example of FIG. 4, an area that is configured by an original data area AR1 that is an area in which the print data (job data) generated by the print data generator 211 of FIG. 2 and the security information set by the security information setting unit 212 of FIG. 2 are stored, an error correction code data area AR2 in which data of an error correction code is stored, and a margin area AR3 that is an area other than an area in which an image of a two-dimensional code is printed within a printable area is a data area. In the example of FIG. 4, a margin exists between positioning markers MK, but data may be stored in this margin. As a specific method for generating an encoded image, the technology disclosed in Japanese Laid-Open Patent Publication No. 2015-011573 can be employed, for example.

Figure 5:
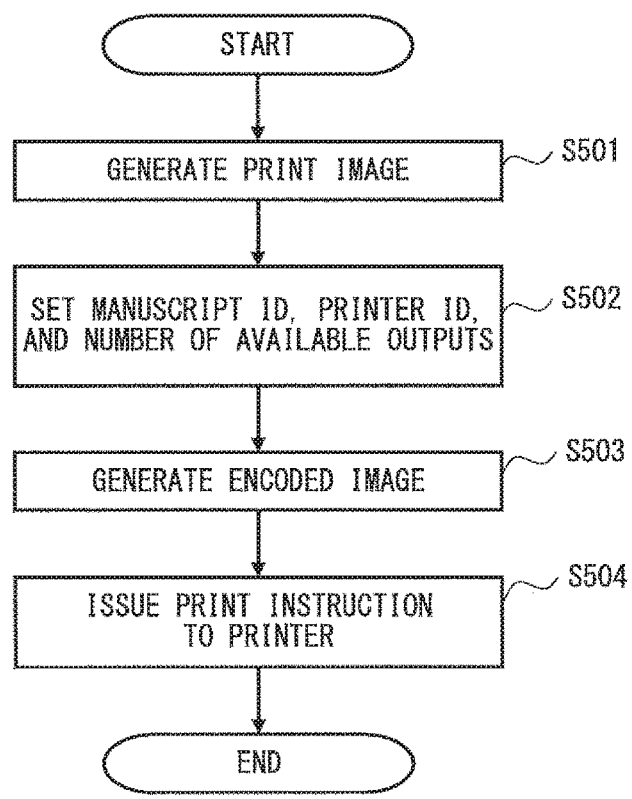
FIG. 5 is a flowchart illustrating an example of encoded image generation processing.

FIG. 5 is a flowchart illustrating an example of the encoded image generation processing performed by the controller 201 of the information terminal device 101 having the exemplary configuration of FIG. 2. This processing may be implemented as a cooperative operation of a dedicated hardware device that implements functions of the respective components 210 to 214 in the controller 201, or may be implemented as an operation in which a processor of the controller 201 executes a control program stored in a memory (not particularly illustrated). It is assumed that the description below of the flowchart of FIG. 5 is given by referring to the respective components in FIG. 2 as needed.

A user of the information terminal device 101 specifies a printer driver that corresponds to the first printer driver from an application executed by the manuscript data generator 210, and executes a print command. At this time, the user specifies a printer ID (image formation device identification information) of the multifunction printer 102 of FIG. 1 and the number of available outputs (number-of-times-of-printing threshold information) on a detailed setting screen of the first printer driver that is displayed on the display unit 204 of FIG. 2. Then, the user executes printing on a screen of the first printer driver.

When printing is executed, the processing illustrated in the flowchart of FIG. 5 is started. First, the print data generator 211 generates print data that is a print image from the manuscript data generated by the manuscript data generator 210 (step S501).

The security information setting unit 212 sets the printer ID and the number of available outputs that have been specified by the user to be security information. In addition, the security information setting unit 212 automatically generates a manuscript ID (manuscript identification information) for identifying the manuscript data, for example, on the basis of a file name and a time stamp of the manuscript data generated by the manuscript data generator 210, and sets the manuscript ID as security information (step S502).

The encoded image generator 213 generates an encoded image in the data format illustrated in FIG. 4 on the basis of the print data generated by the print data generator 211 and the security information set by the security information setting unit 212 (step S503).

Finally, the first printer driver starts a second printer driver 214 that has been preset in the first printer driver and that corresponds to the printing device 103 of FIG. 1. The second printer driver 214 issues an instruction to print the encoded image forwarded from the first printer driver, to the printing device 103 that is connected to the information terminal device 101 via the network 104 of FIG. 1 (step S504). Then, the encoded image generation processing illustrated in the flowchart of FIG. 5 is terminated.

Figure 6:
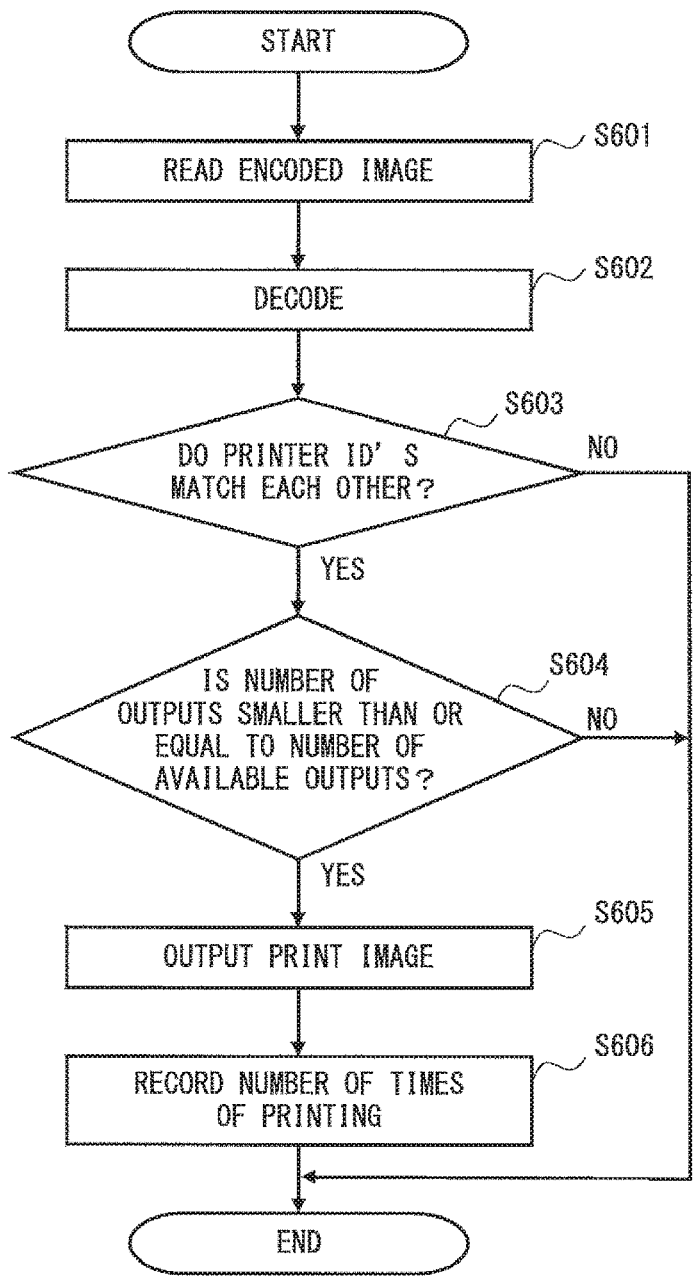
FIG. 6 is a flowchart illustrating an example of image formation processing.

FIG. 6 is a flowchart illustrating an example of the image formation processing performed by the controller 301 in the multifunction printer 102 of FIG. 3. This processing may be implemented as a cooperative operation of a dedicated hardware device that implements functions of the respective components 310 to 314 in the controller 301, or may be implemented as an operation in which a processor of the controller 301 executes a control program stored in a memory (not particularly illustrated). It is assumed that the description below of the flowchart of FIG. 6 is given by referring to respective components in FIG. 3 as needed.

First, a user of the multifunction printer 102 places, on the manuscript table 304, the encoded image illustrated in FIG. 4 that has been printed on a paper medium, and presses a reading button on the operation panel 305. By doing this, the reader 310 scans and reads the encoded image that has been printed on the paper medium placed on the manuscript table 304 by controlling an image reading unit (not particularly illustrated) that is arranged below the manuscript table 304 (step S601).

When the reading operation of step S601 is finished, the decoder 311 decodes print data, and the security information of a printer ID, the number of available outputs, and the manuscript ID from the encoded image read by the reader 310 (step S602).

The output permission determination unit 313 determines whether the printer ID decoded in step S602 is an ID of the local device (step S603).

When the determination of step S603 is NO, the output permission determination unit 313 does not permit printing, and it terminates the image formation processing illustrated in the flowchart of FIG. 6.

When the determination of step S603 is YES, the output permission determination unit 313 determines whether the accumulated number of outputs that has been set in print history information that has been recorded in the external storage 303 by the print history recorder 312 and that corresponds to the manuscript ID decoded in step S602 is smaller than or equal to the number of available outputs decoded in step S602 (step S604).

When the determination of step S604 is NO, the output permission determination unit 313 does not permit printing, and it terminates the image formation processing illustrated in the flowchart of FIG. 6.

When the determination of step S604 is YES, the output permission determination unit 313 determines that an output of the print data is available. The determination of step S604 becomes YES similarly when print history information that corresponds to the manuscript ID decoded in step S602 has not been recorded in the external storage 303 by the print history recorder 312. By doing this, the print execution unit 314 generates image data for printing on the basis of the print data decoded by the decoder 311, outputs the image data to the printer engine 302, and causes the printer engine 302 to print the image data (step S605).

After printing is executed in step S605, when print history information that corresponds to the manuscript identification information decoded in step S602 has not been recorded in the external storage 303, the print history recorder 312 records, in the external storage 303, print history information that corresponds to the manuscript identification information and in which the accumulated number of outputs has been set to 1. When the print history information that corresponds to the manuscript identification information has been recorded in the external storage 303, the print history recorder 312 updates the accumulated number of outputs set in the print history information by incrementing the accumulated number of outputs by 1 (step S606).

Then, the image formation processing illustrated in the flowchart of FIG. 6 is terminated.

Figure 7:
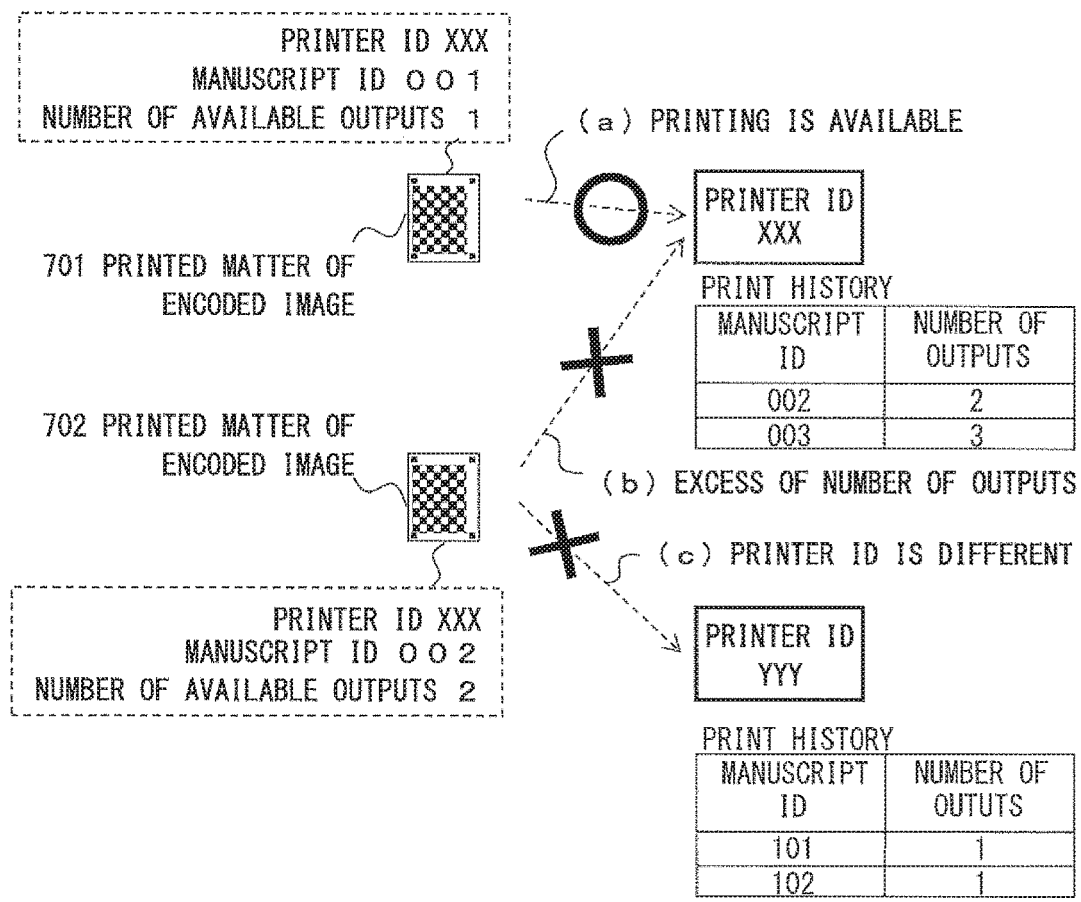
FIG. 7 is a diagram explaining an operation according to an embodiment.

FIG. 7 is a diagram explaining the operations of the encoded image generation processing of FIG. 5 and the image formation processing of FIG. 6. Assume, for example, that a printed matter 701 of an encoded-image illustrated in FIG. 7 is output as a result of the encoded image generation processing of FIG. 5. Also assume, for example, that "printer ID: XXX", "manuscript ID: 001", and "the number of available outputs: 1" are set in the printed matter 701 of the encoded image. Further assume that the printed matter 701 of the encoded image is read by a multifunction printer 102 of "printer ID: XXX" and that the image formation processing of FIG. 6 is performed. In this case, print history information relating to "manuscript ID: 001" has not yet been recorded in the print history information of the multifunction printer 102 of "printer ID: XXX", as illustrated in FIG. 7. Therefore, the determinations of steps S603 and S604 in FIG. 6 become YES, and print data that corresponds to the encoded image above can be printed (FIG. 7 (a)).

Assume, for example, that a printed matter 702 of an encoded image illustrated in FIG. 7 is output as a result of the encoded image generation processing of FIG. 5. Also assume, for example, that "printer ID: XXX", "manuscript ID: 002", and "the number of available outputs: 2" are set in the printed matter 702 of the encoded image. Further assume that the printed matter 702 of the encoded image is read by a multifunction printer 102 of "printer ID: XXX" and that the image formation processing of FIG. 6 is performed. In this case, the number of outputs (the accumulated number of outputs) indicating that two outputs have already been performed has been set in print history information relating to "manuscript ID: 002" within the print history information of the multifunction printer 102 of "printer ID: XXX", as illustrated in FIG. 7. Therefore, the determination of step S603 in FIG. 6 becomes YES, and the determination of step S604 becomes NO. Accordingly, print data that corresponds to the encoded image above is not prohibited from being printed due to an excess of the number of outputs (FIG. 7(b)).

Further assume that the printed matter 702 of the encoded image is read by a multifunction printer 102 of "printer ID: YYY" and that the image formation processing of FIG. 6 is performed. In this case, "printer ID: XXX" set in the printed matter 702 of the encoded image does not match "printer ID: YYY" of the target multifunction printer 102. Therefore, the determination of step S603 in FIG. 6 becomes NO, and print data that corresponds to the encoded image above is prohibited from being printed due to a difference in a printer ID (FIG. 7 (c)).

As described above, according to this embodiment, security control with a high degree of freedom can be achieved in a printing operation using an encoded image. More specifically, security control can be performed that enables only a specified image formation device to perform printing in accordance with information (image formation device identification information) relating to a printer ID embedded into an encoded image. In addition, security control can be performed that restricts the number of times of printing in an image formation device in accordance with information (number-of-times-of-printing threshold information) relating to the number of available outputs embedded in an encoded image. Further, according to this embodiment, an encoded image can be encoded using a two-dimensional code with a high efficiency and a high quality.

In an embodiment, only an output destination printer may be specified. In this case, only "Printer ID" is embedded as security information. In addition, a control flow may be a control flow obtained by omitting step S604 and step S606 in FIG. 6.

In another embodiment, only the number of outputs may be restricted. In this case, "manuscript ID" and "the number of available outputs" are embedded as security information. In addition, a control flow may be a control flow obtained by omitting step S603 in FIG. 6.

In the embodiments described above, in a printing operation to scan an encoded image that has been printed on a paper medium by the information terminal device 101 by using the multifunction printer 102, security control with a high degree of freedom can be achieved.

In contrast, by displaying an encoded image on an encoded image display device such as a tablet terminal and scanning the display using a multifunction printer, security control with a high usability and a high degree of freedom can be achieved.

Alternatively, by recording an encoded image as electronic data in a portable recording medium such as a USB memory, reading the encoded data using the portable recording medium interface 306 of FIG. 3, or the like, and decoding the encoded image, security control with a high usability and a high degree of freedom can be achieved similarly.

The present invention is not limited to the embodiments above with no change, and in an implementing stage, components can be varied and embodied without departing from the gist of the embodiments above. Various inventions can be made by appropriately combining a plurality of components disclosed in the embodiments above. As an example, all of the components disclosed in the embodiments may be appropriately combined. It goes without saying that various variations or applications can be made without departing from the spirit of the invention.

What is claimed is:

1. An image formation system comprising:
an encoded image generation device including a first processor that performs:
   generating print data from manuscript data;
   setting security information for controlling a print mode of the print data; and
   generating an encoded image from the print data and the security information; and
an image formation device including a second processor that performs:
   inputting the encoded image;
   decoding the print data and the security information from the input encoded image;
   determining whether an output of the decoded print data is available in accordance with the decoded security information; and
   outputting the decoded print data when it is determined that the output of the print data is available,
wherein:
the security information includes manuscript identification information that identifies the manuscript data, and number-of-times-of-printing threshold information that sets a threshold of a number of times of printing of the manuscript data, and
the second processor performs:
   recording print history information including the manuscript identification information included in the decoded security information and information relating to an accumulated number of outputs of the decoded print data, every time the decoded print data is output; and
   determining that the output of the print data is available, when the print history information that corresponds to the manuscript identification information included in the decoded security information has not been recorded, or when the print history information that corresponds to the manuscript identification information has been recorded, and the information relating to the accumulated number of outputs included in the print history information is compared with the number-of-times-of-printing threshold information included in the decoded security information so as to find out that printing is available.

2. The image formation system according to claim 1, wherein
the security information includes image formation device identification information for identifying the image formation device, and
the second processor determines that the output of the print data is available when the image formation device identification information included in the decoded security information indicates a local device.

* * * * *